(12) United States Patent
Nakashima et al.

(10) Patent No.: US 9,291,745 B2
(45) Date of Patent: Mar. 22, 2016

(54) OPTICAL LAMINATED BODY

(75) Inventors: Masataka Nakashima, Mihara (JP);
Yoko Kinoshita, Oyama (JP); Tomoyuki Horio, Nagareyama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 253 days.

(21) Appl. No.: 12/294,706

(22) PCT Filed: Mar. 28, 2007

(86) PCT No.: PCT/JP2007/056684
§ 371 (c)(1),
(2), (4) Date: Jan. 26, 2009

(87) PCT Pub. No.: WO2007/114179
PCT Pub. Date: Oct. 11, 2007

(65) Prior Publication Data
US 2009/0168168 A1 Jul. 2, 2009

(30) Foreign Application Priority Data
Mar. 28, 2006 (JP) .................. 2006-088763

(51) Int. Cl.
| G02B 27/28 | (2006.01) |
| B32B 3/00 | (2006.01) |
| G02B 1/10 | (2015.01) |
| B32B 3/30 | (2006.01) |
| B32B 27/28 | (2006.01) |

(Continued)

(52) U.S. Cl.
CPC ... *G02B 1/10* (2013.01); *B32B 3/30* (2013.01); *B32B 27/28* (2013.01); *G02B 1/11* (2013.01); *G02F 1/133502* (2013.01); *G02F 2202/22* (2013.01); *Y10T 428/24612* (2015.01)

(58) Field of Classification Search
USPC .................... 428/172; 359/485, 580
See application file for complete search history.

(56) References Cited

U.S. PATENT DOCUMENTS

| 6,064,524 A * | 5/2000 | Oka .................. G02B 1/11 359/580 |
| 8,003,206 B2 | 8/2011 | Nakashima et al. |
| 2002/0018886 A1* | 2/2002 | Matsufuji et al. ............ 428/328 |

(Continued)

FOREIGN PATENT DOCUMENTS

| JP | 11-103192 A1 | 4/1999 |
| JP | 2001-167637 A1 | 6/2001 |

(Continued)

OTHER PUBLICATIONS

Machine_English_Translation_KR_2007/0003944_A, Doimoto Mitsunobu, May 1, 2007, KIPO, pp. 1-55.*

(Continued)

*Primary Examiner* — Tahseen N Khan
(74) *Attorney, Agent, or Firm* — Burr & Brown, PLLC

(57) ABSTRACT

The present invention discloses an antistatic optical laminate. The optical laminate comprises a light transparent base material and at least an antistatic layer provided on the light transparent base material, where the antistatic layer comprises an electroconductive polymer as an antistatic agent. Further, the surface of the antistatic layer has a concavoconvex shape, and the height of convexes in the antistatic layer are not less than 40 nm and not more than 300 nm.

10 Claims, 1 Drawing Sheet

(51) Int. Cl.
  *G02B 1/11* (2015.01)
  *G02F 1/1335* (2006.01)

(56) References Cited

U.S. PATENT DOCUMENTS

| | | | |
|---|---|---|---|
| 2002/0068134 A1* | 6/2002 | Yagi et al. | 428/1.1 |
| 2004/0223270 A1* | 11/2004 | Nitta et al. | 361/15 |
| 2005/0118922 A1 | 6/2005 | Endo | |
| 2006/0134430 A1* | 6/2006 | Nakashima | G02B 1/105 428/411.1 |
| 2006/0172119 A1* | 8/2006 | Hayashi et al. | 428/156 |
| 2008/0176041 A1* | 7/2008 | Sato et al. | 428/161 |
| 2008/0268215 A1* | 10/2008 | Hattori et al. | 428/212 |

FOREIGN PATENT DOCUMENTS

| | | |
|---|---|---|
| JP | 2004-091618 A1 | 3/2004 |
| JP | 2004-185914 A1 | 7/2004 |
| JP | 2005-182737 A1 | 7/2005 |
| JP | 2005-241989 A1 | 9/2005 |
| JP | 2005-292646 A1 | 10/2005 |
| JP | 2005-305944 A1 | 11/2005 |
| JP | 2006-023350 A1 | 1/2006 |
| JP | 2006-126808 A1 | 5/2006 |
| KR | 2007003944 A * | 1/2007 |
| TW | 200540471 A | 12/2005 |
| WO | WO 2005010572 A1 * | 2/2005 |
| WO | WO 2005090473 A1 * | 9/2005 |
| WO | WO 2005095098 A1 * | 10/2005 |
| WO | WO 2006095612 A1 * | 9/2006 |

OTHER PUBLICATIONS

Japanese Office Action dated Jan. 10, 2012 (with English translation).

Taiwanese Office Action dated Dec. 17, 2012.

* cited by examiner

OPTICAL LAMINATED BODY

CROSS RELATED TO RELATED APPLICATION

This application is based upon and claims the benefit of priority from the prior Japanese Patent Applications No. 88763/2006 under the Paris Convention, and, thus, the entire contents thereof are incorporated herein by reference.

FIELD OF THE INVENTION

The present invention relates to an optical laminate which can realize the prevention of interface reflection and interference fringes.

BACKGROUND OF THE INVENTION

A reduction in reflection of light applied from external light sources such as fluorescent lamps and an enhancement in the visibility of image are required of an image display face in image display devices such as liquid crystal displays (LCDs) or cathode ray tube display devices (CRTs). To this end, it is common practice to reduce the reflection from the image display face in the image display device and thus to improve the visibility by providing an optical laminate (for example, an antireflection laminate) which has realized a lowered reflectance by covering the surface of a transparent object with a transparent film having a low refractive index.

The prevention of lowered contrast and lowered visibility caused by external light reflection or image reflection is required of image display devices, for example, cathode ray tube display devices (CRTs), plasma displays (PDPs), organic or inorganic electroluminescent displays (ELDs), field emission displays (FEDs), or liquid crystal displays (LCDs). Accordingly, it is common practice to provide an antireflection laminate on the outermost surface of an image display device from the viewpoint of reducing image reflection or reflectance using the principle of light scattering or the principle of optical interference.

Further, for example, from the viewpoint of contamination preventive properties of the display face of image display devices, it is common practice to provide an antistatic layer in the optical laminate. For example, Japanese Patent Laid-Open No. 94007/2004 proposes an antireflection optical laminate comprising an antistatic layer and a hard coat layer provided in that order smoothly on a surface of a light transparent base material.

In the antireflection laminate with a layer having a large refractive index difference stacked thereon, interface reflection and interference fringes often occur at a mutually superimposed layer interface. In particular, it has been pointed out that interference fringes occur at the interface of a light transparent base material and an antistatic layer resulting in lowered image visibility.

So far as the present inventors know, up to now, any optical laminate, which could have effectively prevented interface reflection and interference fringes by adopting an antistatic layer having a concavoconvex shape and specifying the concavoconvex shape by specific property values and, at the same time, the adhesion of interface between layers constituting the optical laminate could have been improved by adopting an antistatic layer having a concavoconvex surface, has not been proposed.

SUMMARY OF THE INVENTION

At the time of the present invention, the present inventors have found that the adhesion of interface between layers constituting the optical laminate can be improved by adopting an antistatic layer in a concavoconvex form and specifying the concavoconvex shape by specific property values, and interface reflection and interference fringe occurrence at the interface between the antistatic layer and the light transparent base material and/or the hard coat layer, can be effectively prevented by substantially eliminating the interface. Accordingly, the present invention provides an optical laminate, which has mechanical strength and has improved antireflection function and visibility, by drawing attention to the interface of a light transparent base material and/or a hard coat layer and an antistatic layer to realize high adhesion therebetween and rendering the interface substantially absent.

Thus, according to the present invention, there is provided an optical laminate comprising a light transparent base material and at least an antistatic layer provided on the light transparent base material, wherein the antistatic layer comprises an electroconductive polymer as an antistatic agent, the surface of the antistatic layer has a concavoconvex shape, and the height of convexes in the antistatic layer is not less than 40 nm and not more than 300 nm.

DETAILED DESCRIPTION OUT THE INVENTION

I. Optical Laminate

Figure 1:
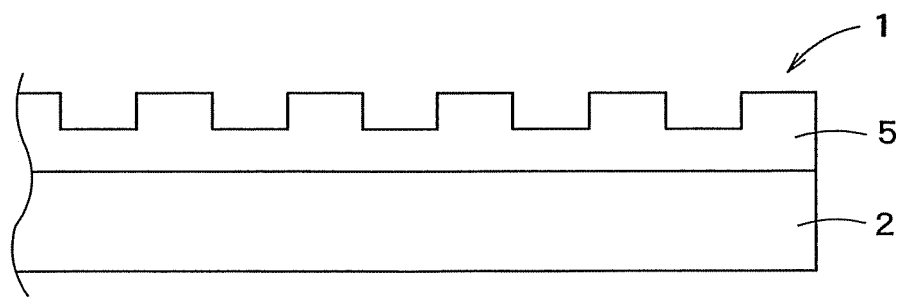
FIG. 1 is a cross-sectional view in one embodiment of the optical laminate according to the present invention.

The optical laminate according to the present invention will be described with reference to the accompanying drawings. FIG. 1 is a cross-sectional view of an optical laminate 1 according to the present invention. In FIG. 1, an antistatic layer 5 is provided on the light transparent base material 2. The antistatic layer 5 is in a concavoconvex form. The concavoconvex shape may be a corrugated form, a mountain form, a trapezoid form, a quadrilateral form or the like. The concavoconvex shape is preferably a trapezoid form or a quadrilateral form, more preferably a quadrilateral form. The quadrilateral form may be any of square, rectangle and the like.

Figure 2:
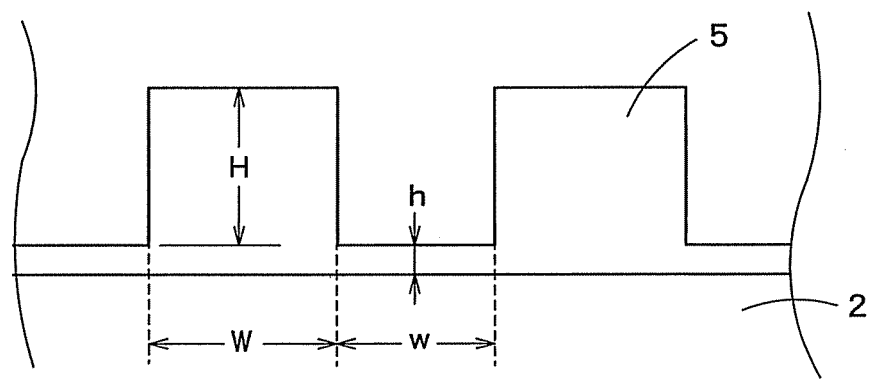
FIG. 2 is an enlarged cross-sectional view of the antistatic layer according to the present invention.

FIG. 2 is an enlarged view of the concavoconvex shape of the antistatic layer 2 in the optical laminate 1 according to the present invention shown in FIG. 1. In FIG. 2, the concavoconvex shape is quadrilateral. In the present invention, the height (H) of the convex part in the antistatic layer is not less than 40 nm and not more than 300 nm as measured in the vertical direction from the surface of the light transparent base material. Preferably, the lower limit of the height (H) is 100 nm, and the upper limit of the height (H) is 200 nm (more preferably 150 nm). The width (W) of the convex part in the antistatic layer is not less than 40 nm and not more than 100 μm as measured in the vertical direction from the surface of the light transparent base material. Preferably, the lower limit of the width (W) is 100 nm (more preferably 500 nm), and the upper limit of the width (W) is 50 μm (more preferably 1 μm).

In the present invention, the height (h) of the concave part in the antistatic layer is not less than 5 nm and not more than 40 nm as measured in the vertical direction from the surface of the light transparent base material. Preferably, the upper limit of the height (h) is 30 nm (more preferably 20 nm). The width (w) of the concave part in the antistatic layer is not less than 10 nm and not more than 100 μm as measured in the vertical direction from the surface of the light transparent base material. Preferably, the lower limit of the width (w) is 10 μm (more preferably 1 μm).

Figure 3:
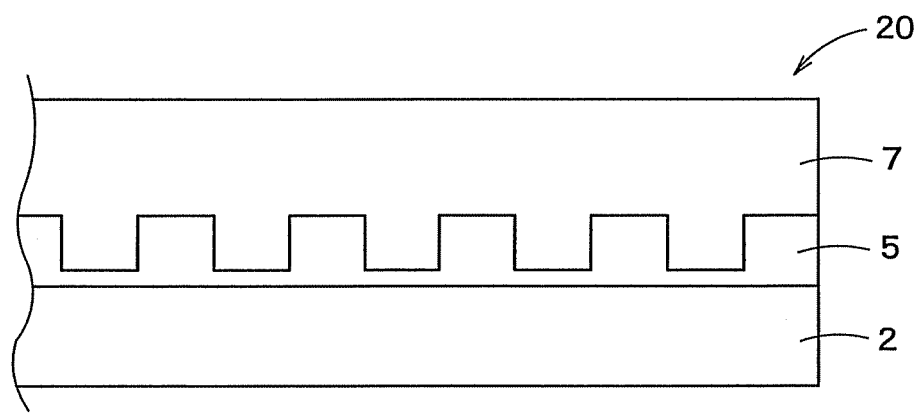
FIG. 3 is a cross-sectional view in one embodiment of the optical laminate according to the present invention.

FIG. 3 is a cross-sectional view of a preferred optical laminate according to the present invention. In the optical laminate 20 shown in FIG. 3, an antistatic layer according to the present invention is provided on a light transparent base material 2. A hard coat layer 7 is further provided on the antistatic layer. In a preferred embodiment of the present invention, the hard coat layer may comprise a resin and a penetrating solvent and may be formed from a composition for a hard coat layer comprising these components. Upon the application of the composition for a hard coat layer onto the antistatic layer 5, the penetrating solvent penetrates and/or wets the antistatic layer 5 or the light transparent base material 2. That is, it is considered that, upon the application of the composition for a hard coat layer onto the antistatic layer 5, the penetrating solvent penetrates or wets the antistatic layer 5 and the light transparent base material 2 and, consequently, the hard coat layer 7 and the antistatic layer 5 are joined together, and the antistatic layer 5 and the light transparent base material 2 are joined together, whereby the interface of the hard coat layer 7 and the antistatic layer 5 and the interface of the antistatic layer 5 and the light transparent base material 2 are (substantially) eliminated. In particular, in the present invention, it is considered that, by virtue of the provision of the concavoconvex shape in the antistatic layer 5, the penetrating solvent is more significantly penetrated into the antistatic layer 5 or the light transparent base material than the case where the antistatic layer is flat.

(Substantial) Absence (Disappearance) of Interface

In the present invention, the expression "interface is (substantially) absent" means that there is no interface although two layer faces are superimposed on top of each other, and further connotes that, based on the refractive index value, the interface is judged to be absent between both the layer faces. A specific example of a criterion based on which the "interface is (substantially) absent" is that, when visual observation of the cross section of the optical laminate under a laser microscope shows the presence of interference fringes, the interface is judged to be present, while, when visual observation of the cross section of the optical laminate under a laser microscope shows the absence of interference fringes, the interface is judged to be absent. In another example of a criterion based on which the "interface is (substantially) absent," interference fringes of the optical laminate are observed. The interference fringes can be confirmed by applying a black tape onto the backside of the optical laminate and visually observing the optical laminate from above the optical laminate under the application of light emitted from a three-wavelength fluorescent lamp. Further, when interference fringes are noticeable in visual observation of the cross section of the optical laminate, the presence of the interface is confirmed by the observation of the optical laminate under a laser microscope. On the other hand, when interference fringes are not noticeable in visual observation of the cross section of the optical laminate, the interface is not observed in the observation of the optical laminate under a laser microscope. In this case, it can be said that "interface is (substantially) absent". The laser microscope can observe the cross section of materials different in refractive index in a nondestructive manner. Accordingly, in the case of materials having no significant difference in refractive index therebetween, the results of the measurement show that there is no interface between these materials. Therefore, it can also be judged based on the refractive index that there is no interface in the optical laminate.

1. Antistatic Layer

The antistatic layer comprises an electroconductive polymer as an electroconductive agent, a resin, and optional components.

Antistatic Agent (Electroconductive Agent)

In the present invention, electroconductive polymers are used as the antistatic agent (electroconductive agent). Accordingly, there is no need to use fine particles of a rare metal or a metal oxide. Specific examples of electroconductive polymers include aliphatic conjugated polyacetylenes, aromatic conjugated poly(paraphenylenes), polyacene, heterocyclic conjugated polypyrroles, polyisothianaphthene, polythiophenes or its derivatives, heteroatom-containing conjugated polyanilines, and mixture-type conjugated poly (phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

In the present invention, among the specifically exemplified electroconductive polymers, polythiophenes or derivatives thereof are preferred. The polythiophene derivatives are represented by general formula (I):

[Chemical formula 1]

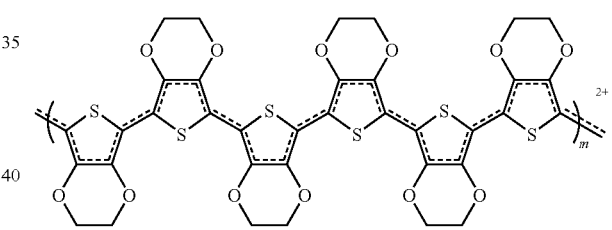

wherein m is a number of 1 to 50.

Other Antistatic Agent (Electroconductive Agent)

The anti-dazzling layer according to the present invention may contain other antistatic agent (electroconductive agent) in addition to the above antistatic agents. Specific examples of electroconductive agents (antistatic agents) include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent.

Electroconductive polymers may be mentioned as the antistatic agent. The electroconductive polymer is not particularly limited, and an example thereof is at least one polymer selected from the group consisting of aliphatic conjugated polyacetylenes, polyacenes, polyazulenes, aromatic conjugated polyphenylenes, heterocyclic conjugated polypyrroles, polythiophenes, polyisothianaphthenes, heteroatom-containing conjugated polyanilines, polythienylenevinylenes, mixture-type conjugated poly(phenylenevinylenes), double-chain conjugated systems which are conjugated systems having a plurality of conjugated chains in the molecule thereof, derivatives of these electroconductive polymers, and electroconductive composites which are polymers prepared by grafting or block-copolymerizing the above conjugated polymer chain onto a saturated polymer. Among others, the use of organic antistatic agents such as polythiophene, polyaniline, and polypyrrole is more preferred. The use of the organic antistatic agent can realize the development of excellent antistatic properties and, at the same time, can enhance the total light transmittance of the optical laminate, and can lower the haze value. Further, with a view to improving the electroconductivity and improving the antistatic properties, anions of an organic sulfonic acid, iron chloride or the like may also be added as a dopant (an electron donating agent). Based on dopant addition effect, polythiophene has a high level of transparency and a high level of antistatic properties and thus is particularly preferred. Oligothiophene is also suitable as the polythiophene. The above derivatives are not particularly limited, and examples thereof include alkyl substitutes of polyphenylacetylene and polydiacetylene.

Curing-type Resin

In the present invention, when coating is carried out using electroconductive fine particles, a curing-type resin is preferably used. The curing-type resin is preferably transparent, and specific examples thereof include ionizing radiation curing resins which are curable upon exposure to ultraviolet light or electron beams, solvent drying resins, heat curing resins, or their mixtures. Preferred are ionizing radiation curing resins.

Ionizing Radiation Curing Resins

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional and polyfunctional monomers such as ethyl(meth)acrylate, ethylhexyl (meth)acrylate, styrene, methylstyrene, and N-vinylpyrrolidone, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When ionizing radiation curing resins are used as an ultraviolet curing resin, preferably a photopolymerization initiator is used. Specific examples of photopolymerization initiators include acetophenones, benzophenones, Michler's benzoyl benzoate, α-amyloxime ester, tetramethyl thiuram monosulfide, and thioxanthones. Preferably, photosensitizers are mixed in the system. Specific examples of photosensitizers include n-butylamine, triethylamine, and poly-n-butylphosphine.

Photopolymerization Initiator

In the present invention, preferred photopolymerization initiators to be added to the ionizing radiation curing resin composition include, for example, acetophenones, benzophenones, Michler's benzoyl benzoate, α-amyloxime ester, tetramethylthiuram monosulfide, and thioxanthones. If necessary, photosensitizers and photopolymerization accelerators are added to the ionizing radiation curing resin composition. Conventional photosensitizers and photopolymerization accelerators may be used as the photosensitizer and photopolymerization accelerator, and examples thereof include benzoin compounds such as benzoin, benzoin methyl ether, benzoin ethyl ether, benzoin isopropyl ether, α-methylbenzoin, and α-phenylbenzoin; anthraquinone compounds such as anthraquinone and methylanthraquinone; benzyl; diacetyl; phenyl ketone compounds such as acetophenone and benzophenone; sulfide compounds such as diphenyl disulfide and tetramethylthiuram sulfide; α-chloromethyl naphthalene; anthracene; halogenated hydrocarbons such as hexachlorobutadiene and pentachlorobutadiene; thioxanthone; n-butylamine; triethylamine; and tri-n-butylphosphine. Specifically, benzophenon or thioxanthone photosensitizers are preferred as the acetophenone photopolymerization initiators.

Solvent Drying-type Resin

The solvent drying-type resin (resin which forms a film through mere removal of solvent by drying) used as a mixture with the ionizing radiation curing resin is mainly a thermoplastic resin. Commonly exemplified thermoplastic resins are usable. The solvent drying-type resin, when added, can effectively prevent coating film defects of coated face.

In a preferred embodiment of the present invention, when the base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose. The use of the cellulosic resin can improve the adhesion between the base material and the antistatic layer and transparency.

Heat Curing Resin

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. In the present invention, preferably, MMA (methyl methacrylate)-BA(butyl acrylate)-2-HEMA (2-hydroxyethyl methacrylate) is used. When a copolymer heat curing resin is used, if necessary, for example, curing agents such as crosslinking agents and polymerization initiators, polymerization accelerators, solvents, and viscosity modifiers may be further added.

In a preferred embodiment of the present invention, the surface resistivity value of the surface (antistatic layer) of the antistatic laminate is preferably not less than 106 Ω/cm$^2$ and not more than $10^{12}$ Ω/cm$^2$. The mixing weight ratio between the antistatic agent and the curing-type resin is preferably selected so that this surface resistivity value is obtained. The surface resistivity value of the outermost surface on the image display side of a polarizing plate using the antistatic laminate according to the present invention also falls within the above-defined range.

Formation of Antistatic Layer

In the formation of a coating film as an antistatic layer, a composition comprising a mixture of an antistatic agent, a resin, and a solvent (as described above in connection with the hard coat layer) is coated by coating methods such as roll coating, Mayer bar coating, or gravure coating. After coating of the liquid composition, drying and ultraviolet curing (in the case of an ultraviolet curing resin) are carried out. The ionizing radiation curing resin composition is cured by electron beam or ultraviolet irradiation. In the case of the electron beam curing, for example, electron beams having an energy of 100 KeV to 300 KeV are used. On the other hand, in the case of ultraviolet curing, for example, ultraviolet light contained in light emitted from ultra-high-pressure mercury lamps, high-pressure mercury lamps, low-pressure mercury lamps, carbon arc lamps, xeon arc lamps, and metal halide lamps is used. In the formation of the antistatic layer, the surface resistivity value of the antistatic layer is preferably not more than $5 \times 10^7$ $\Omega/cm^2$.

2. Hard Coat Layer

The term "hard coat layer" as used herein refers to a layer having a hardness of "H" or higher as measured by a pencil hardness test specified in JIS 5600-5-4 (1999). The thickness (in a cured state) of the hard coat layer is 0.1 to 100 μm, preferably 0.8 to 20 μm. The hard coat layer may comprise a resin, a solvent, and a penetrating solvent (preferably), and optional components.

Penetrating Solvent

In the present invention, penetrating solvents may also be used to form the hard coat layer. The penetrating solvent is a solvent which is penetrable into the light transparent base material and an optical layer such as a hard coat layer. In the present invention, the term "penetrability" in the penetrating solvent embraces all concepts of penetrating, swelling, dissolving, wetting and other properties in relation to the light transparent base material. Accordingly, it is considered that, for example, upon the application of a composition for optical layer (for example, hard coat layer) formation containing a penetrating solvent onto the light transparent base material, the following behavior is developed. 1) The light transparent base material is swollen with the penetrating solvent. Thereafter, both the penetrating solvent and the composition for other optical layer formation are penetrated into the light transparent base material. Consequently, the interface of the light transparent base material and the optical layer formed thereon is brought to a mixed state. 2) The light transparent base material is swollen with the penetrating solvent and is further dissolved in the penetrating solvent. As a result, the component of the light transparent base material is floated into the formed optical layer, and the component of the light transparent base material and the composition for optical layer formation are mixed together at the interface therebetween. 3) The component for the light transparent base material and the composition for the formed optical layer are mixed together at the interface therebetween as simultaneous development of the following phenomena: the light transparent base material is swollen with the penetrating solvent; the penetrating solvent or a mixture of the penetrating solvent and the composition for optical layer formation is then penetrated into the light transparent base material; and the swollen light transparent base material is further dissolved in the penetrating solvent resulting in floating of the component for the light transparent base material into the composition for the formed optical layer.

Specific examples of penetrating solvents include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons such as chloroform, methylene chloride, and tetrachloroethane; or their mixtures. Preferred are esters and ketones.

Specific examples of penetrating solvents include acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methylcellosolve, ethylcellosolve, and butylcellosolve. Preferred are methyl acetate, ethyl acetate, butyl acetate, methyl ethyl ketone, and the like.

The addition of the penetrating solvent to the composition for a hard coat layer is preferred. In this case, the amount of the penetrating solvent added to the composition for a hard coat layer is not less than 10% by weight based on the total weight of the composition for a hard coat layer. Preferably, the lower limit of the addition amount of the penetrating solvent is 20% by weight, and the upper limit of the addition amount of the penetrating solvent is 70% by weight.

Resin

The resin is preferably transparent, and specific examples thereof include ionizing radiation curing resins which are curable upon exposure to ultraviolet light or electron beams, ionizing radiation curing resins, heat curing resins, or mixtures of two or more of the above resins. Preferred are ionizing radiation curing resins. The details of these resins may be the same as those described above in connection with the antistatic layer. In the present invention, curable resin precursors such as monomers, oligomers, or prepolymers are sometimes referred to as "resin," unless otherwise specified.

Optional Components
Polymerization Initiators

In the formation of the hard coat layer, a photopolymerization initiator may be used. A specific example thereof is 1-hydroxy-cyclohexyl-phenyl-ketone. This compound is commercially available, and an example thereof is a commercially available product under the tradename designation Irgacure 184 (manufactured by Ciba Specialty Chemicals, K.K.).

Solvent

A composition, for a hard coat layer, comprising the above components mixed into a solvent is utilized in the formation of the hard coat layer. Specific examples of solvents include alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or their mixtures. Preferred are ketones and esters.

Formation of Hard Coat Layer

The hard coat layer may be formed by the composition produced by mixing the resin, the solvent, and optional components together onto a light transparent base material. In a preferred embodiment of the present invention, preferably, a fluoro- or silicone-type or other leveling agent is added to the above liquid composition. The liquid composition to which the leveling agent has been added, can effectively prevent the inhibition of curing by oxygen to the surface of the coating film during coating or drying and, at the same time, impart scratch resistant effect.

Methods usable for coating the composition include coating methods such as roll coating, Mayer bar coating, and gravure coating. After coating of the liquid composition, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

3. Light Transparent Base Material

The light transparent base material is preferably transparent, smooth, and resistant to heat and has excellent mechanical strength. Specific examples of materials usable for the light transparent base material formation include thermoplastic resins, for example, polyester, cellulose triacetate, cellulose diacetate, cellulose acetate butyrate, polyester, polyamide, polyimide, polyethersulfone, polysulfone, polypropylene, polymethylpentene, polyvinyl chloride, polyvinyl acetal, polyether ketone, polymethyl methacrylate, polycarbonate, and polyurethane. Preferred are polyesters and cellulose triacetate.

The thickness of the light transparent base material is not less than 20 µm and not more than 300 µm. Preferably, the lower limit of the thickness is 30 µm, and the upper limit of the thickness is 200 µm. When the light transparent base material is a plate-like material, the thickness may be above the upper limit of the above-defined thickness range. In forming a layer having optical properties on the light transparent base material, the base material may be previously subjected to physical treatment such as corona discharge treatment or oxidation treatment or may be previously coated with an anchoring agent or a coating material known as a primer from the viewpoint of improving the adhesion.

In a preferred embodiment of the present invention, the light transparent base material is smooth and resistant to heat and has excellent mechanical strength. Specific examples of materials usable for the light transparent base material formation include thermoplastic resins, for example, polyesters (polyethylene terephthalate, polyethylene naphthalate, polybutylene terephthalate, and polybutylene naphthalate), cellulose triacetate, cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, and polyurethane. Preferred are polyesters (polyethylene terephthalate and polyethylene naphthalate) and cellulose triacetate.

The light transparent base material is preferably used as a highly flexible film of a thermoplastic resin. Depending upon the form of use where curability are required, plate-like materials such as plates of these thermoplastic resins or glass plates are also usable.

Films of amorphous olefin polymers (cycloolefin polymers: COPs) having an alicyclic structure may also be mentioned as other examples of the light transparent base material, and these are base materials using norbornene polymers, monocyclic olefinic polymers, cyclic conjugated diene polymers, vinyl alicyclic hydrocarbon polymers and the like. Examples thereof include Zeonex and ZEONOR (norbornene resins), manufactured by Zeon Corporation, Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 Series (alicyclic acrylic resins) manufactured by Hitachi Chemical Co., Ltd. Further, FV Series (low birefringent index and low photoelastic films) manufactured by Asahi Kasei Chemicals Corporation are also preferred as base materials alternative to triacetylcellulose.

When the light transparent base material is a plate-like material, the thickness may be above the upper limit of the above-defined thickness range, that is, not less than 300 µm and not more than 5000 µm. In forming a hard coat layer, an antistatic layer and the like on the light transparent base material, the base material may be previously subjected to physical treatment such as corona discharge treatment or oxidation treatment or may be previously coated with an anchoring agent or a coating material known as a primer from the viewpoint of improving the adhesion.

4. Other Layers

Low-refractive Index Layer

The low-refractive index layer may comprise a low-refractive index agent and a resin.

In a preferred embodiment of the present invention, when external light (for example, light from a fluorescent lamp and natural light) is reflected from the surface of the optical laminate, the low-refractive index layer functions to lower the reflectance. The low-refractive index layer is preferably formed of any one of, for example, 1) a silica- or magnesium fluoride-containing material, 2) a fluoro material which is a low-refractive index resin, 3) a silica- or magnesium fluoride-containing fluoro material, and 4) a thin film of silica or magnesium fluoride. Regarding the materials other than the fluoro material, the same material as the material constituting the hard coat layer may be used. The low-refractive index layer may be formed of a low-refractive index agent and a resin. The low-refractive index layer has a refractive index of not more than 1.45, particularly preferably not more than 1.42. The thickness of the low-refractive index layer is not limited. In general, the thickness of the low-refractive index layer may be properly selected from a range of approximately 30 nm to 1 µm.

Low-refractive Index Agent

The low-refractive index agent preferably has a refractive index of less than 1.5, more preferably not more than 1.45. When the refractive index is the above-defined value, the hardness of the surface of the optical laminate and physical properties such as scratch resistance can be advantageously improved. The mixing ratio between the resin component and the low-refractive index agent is preferably resin component/low-refractive index agent=approximately 30/70 to 95/5.

Specific examples of low-refractive index agents include silicone-containing vinylidene fluoride copolymers, and an example thereof is a composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, or the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition should be 60 to 70% by weight, more preferably 62 to 70% by weight, particularly preferably 64 to 68% by weight. When the fluorine content is in the above-defined specific range, the fluorine-containing copolymer has good solubility in solvents. The incorporation of the fluorine-containing copolymer as a component can realize the formation of an optical laminate having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the resultant fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed optical laminate has good antireflection effect.

The addition amount of the resin is 30 to 150 parts by weight, preferably 35 to 100 parts by weight, particularly preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight. When the addition amount or the fluorine content is in the above-defined range, the surface modifying layer has good adhesion to the base material and has a high refractive index, whereby good antireflection effect can be attained.

In a preferred embodiment of the present invention, the utilization of "void-containing fine particles" as a low-refractive index agent is preferred. The "void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles produced by using a technique disclosed in Japanese Patent Laid-Open No. 233611/2001. Void-containing silica fine particles can easily be produced and as such have high hardness. Therefore, when a low-refractive index layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP Series (tradename), manufactured by Nissan Chemical Industries Ltd., having such a structure that silica fine particles have been connected to one another in a chain form. Fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the low-refractive index layer.

Preferred Low-refractive Index Agents

In the present invention, preferred low-refractive index agents include low-refractive index inorganic ultrafine particles such as silica and magnesium fluoride (all types of fine particles such as porous and hollow fine particles), and fluororesins which are low-refractive index resins. Polymerizable compounds containing a fluorine atom at least in their molecule, or polymers thereof are usable as the fluororesin. The polymerizable compound is not particularly limited. However, for example, those containing a curing reactive group such as a functional group curable by an ionizing radiation or a heat curable polar group are preferred. Further, compounds simultaneously having these reactive groups are also possible. Unlike the polymerizable compounds, the polymer does not have the above reactive groups at all.

Ethylenically unsaturated bond-containing fluorine-containing monomers are extensively usable as the polymerizable compound having an ionizing radiation curing group. More specific examples thereof include fluoroolefins (for example, fluoroethylene, vinylidene fluoride, tetrafluoroethylene, hexafluoropropylene, perfluorobutadiene, and perfluoro-2,2-dimethyl-1,3-dioxol). Specific examples of (meth) acryloyloxy group-containing compounds include (meth) acrylate compounds having a fluorine atom in their molecule such as 2,2,2-trifluoroethyl(meth)acrylate, 2,2,3,3,3-pentafluoropropyl(meth)acrylate, 2-(perfluorobutyl)ethyl(meth) acrylate, 2-(perfluorohexyl)ethyl (meth)acrylate, 2-(perfluorooctyl)ethyl(meth)acrylate, 2-(perfluorodecyl)ethyl(meth) acrylate, methyl α-trifluoromethacrylate, and ethyl α-trifluoromethacrylate; and fluorine-containing polyfunctional (meth)acrylic ester compounds containing a fluoroalkyl, fluorocycloalkyl, or fluoroalkylene group which contains at least three fluorine atoms and has 1 to 14 carbon atoms and at least two (meth)acryloyloxy groups in their molecule.

Preferred heat curing polar groups include, for example, hydrogen bond forming groups such as hydroxyl, carboxyl, amino, and epoxy groups. These groups are excellent in adhesion to the coating film, as well as in affinity for inorganic ultrafine particles such as silica. Heat curing polar group-containing polymerizable compounds include, for example, 4-fluoroethylene-perfluoroalkyl vinyl ether copolymers; fluoroethylene-hydrocarbon-type vinyl ether copolymers; and fluorine modification products of resins such as epoxy resins, polyurethane resins, cellulose resins, phenolic resins, and polyimide resins.

Examples of polymerizable compounds containing both an ionizing radiation curing group and a heat curing polar group include partially and fully fluorinated alkyl, alkenyl, and aryl esters of acrylic or methacrylic acid, fully or partially fluorinated vinyl ethers, fully or partially fluorinated vinyl esters, and fully or partially fluorinated vinyl ketones.

Specific examples of fluoropolymers include polymers of a monomer or monomer mixture containing at least one of fluorine-containing (meth)acrylate compounds of the above ionizing radiation curing group-containing polymerizable compounds; copolymers of at least one of the above fluorine-containing (meth)acrylate compounds with (meth)acrylate compounds not containing a fluorine atom in their molecule, for example, methyl(meth)acrylate, ethyl (meth)acrylate, propyl(meth)acrylate, butyl(meth)acrylate, and 2-ethylhexyl (meth)acrylate; and homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene.

Silicone-containing vinylidene fluoride copolymers which are copolymers comprising a silicone component incorporated into the above copolymers may also be used. Silicone components include, for example, (poly)dimethylsiloxanes, (poly)diethylsiloxanes, (poly)diphenylsiloxanes, (poly)methyphenylsiloxanes, alkyl-modified (poly)dimethylsiloxanes, azo group-containing (poly)dimethylsiloxanes, dimethyl silicones, phenylmethyl silicones, alkyl/aralkyl-modified silicones, fluorosilicones, polyether-modified silicones, fatty acid ester-modified silicones, methyl hydrogen silicones, silanol group-containing silicones, alkoxy group-containing silicones, phenol group-containing silicones, methacryl-modified silicones, acryl-modified silicones, amino-modified silicones, carboxylic acid-modified silicones, carbinol-modified silicones, epoxy-modified silicones, mercapto-modified silicones, fluorine-modified silicones, and polyether-modified silicones. Among others, those having a dimethylsiloxane structure are preferred.

Nonpolymers or polymers of the following compounds are also usable as the fluororesin. Specific examples thereof include compounds produced by reacting a fluorine-containing compound containing at least one isocyanate group in the molecule thereof with a compound containing in its molecule at least one functional group reactive with the isocyanate group, for example, an amino group, a hydroxyl group, or a carboxyl group; and compounds produced by reacting a fluorine-containing polyol such as a fluorine-containing polyether polyol, a fluorine-containing alkyl polyol, a fluorine-containing polyester polyol, or a fluorine-containing ε-caprolactone-modified polyol with an isocyanate group-containing compound.

Further, the above fluorine atom-containing polymerizable compound and polymer may be used as a mixture with each resin component as described above in connection with the anti-dazzling layer. Furthermore, curing agents for curing reactive groups and the like and various additives and solvents for improving coatability or imparting contamination preventive properties may be properly used.

Resin

The resin may be the same as that described above in connection with the antistatic layer.

II. Production Process of Optical Laminate

Preparation of Compositions for Individual Layers

The composition for each layer may be prepared by mixing the above-described components together for dispersion by a conventional preparation method. The mixing/dispersing can be properly carried out, for example, in a paint shaker or a bead mill. The dispersed composition for each layer may be then filtered.

Layer Formation Method

Specific examples of methods for each layer formation include various methods, for example, spin coating, dip coating, spray coating, die coating, bar coating, roll coating, meniscus coating, flexographic printing, screen printing, and bead coating. A curing-type resin composition may be cured by electron beam or ultraviolet light irradiation. In the case of the electron beam curing, for example, electron beams having an energy of 100 KeV to 300 KeV are used. On the other hand, in the case of ultraviolet curing, for example, ultraviolet light contained in light emitted from ultra-high-pressure mercury lamps, high-pressure mercury lamps, low-pressure mercury lamps, carbon arc lamps, xeon arc lamps, and metal halide lamps is used.

III. Use of Optical Laminate

The optical laminate according to the present invention may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from an optical functional layer such as the hard coat layer faces the surface of the polarizing element.

The polarizing element may comprise, for example, polyvinyl alcohol films, polyvinyl formal films, polyvinyl acetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display device is utilized in transmission display devices, particularly in displays of televisions, computers, word processors and the like. Among others, the image display device is used on the surface of displays for high-definition images such as CRTs and liquid crystal panels. The optical laminate according to the present invention can be provided on displays, which do not require the use of any backlight, for example, selfluminous PDPs, ELDs, FEDs, CRTs and the like, to provide image display devices.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following Examples further illustrate the present invention. However, it should be noted that the contents of the present invention are not limited by these Examples.

Example 1

Formation of Antistatic Layer

A transparent base material (an 80 μm-thick triacetylcellulose resin film (TF80UL, manufactured by Fuji Photo Film Co., Ltd.,) was provided. A polythiophene dispersion liquid (TA2010, manufactured by Idemitsu Technofine Co., Ltd.) was coated by gravure direct coating onto one side of the film with a helio plate (90 cm/line, cell width 140 μm, depth 11 μm), and the coating was dried at 70° C. for 2 min to form an antistatic layer with concavoconvexes having a convex height (H) of 150 nm, a convex part width (W) of 2.5 μm, and a concave part height (h) of 10 nm.

Formation of Hard Coat Layer

A composition for a hard coat layer having the following composition was coated onto the formed antistatic layer, and the assembly was held in a hot oven of 70° C. for 30 sec to evaporate the solvent contained in the coating film. Thereafter, ultraviolet light was applied at an integrated quantity of ultraviolet light of 46 mj to cure the coating film and thus to form a hard coat layer at a coverage of 15 g/cm$^2$ (on a dry basis). Thus, an antistatic optical laminate was produced.

Composition

Pentaerythritol triacrylate (manufactured by Nippon Kayaku Co., Ltd., tradename; PET30) 100 pts·ms.

Methyl ethyl ketone 43 pts·ms. Leveling agent (manufactured by Dainippon Ink and Chemicals, Inc., tradename; MCF-350-5) 2 pts·ms.

Polymerization initiator (manufactured by Ciba Specialty Chemicals K.K., tradename; Irgacure 184) 6 pts·ms.

Comparative Example 1

An antistatic optical laminate was produced in the same manner as in Example 1, except that TA2010 manufactured by Idemitsu Technofine Co., Ltd. was spin coated by wide area printing to form a smooth antistatic layer.

Evaluation Test

The following evaluation test was carried out for the antistatic optical laminates of Example 1 and Comparative Example 1. The results are shown in Table 1.

Evaluation 1: Evaluation Test on Interference Fringe Occurrence

Interference fringes were evaluated as follows. The surface of the optical laminate remote from the hard coat layer (on TAC surface side) was rubbed with a steel wool. Thereafter, a black vinyl tape was applied. The optical laminate was then visually observed under a three-wavelength fluorescent lamp, and the results were evaluated according to the following evaluation criteria.

Evaluation Criteria

○: Interference fringes were not observed.

x: Interference fringes were observed, and the presence of the interference fringes could easily be confirmed.

Evaluation 2: Evaluation Test on Adhesion 100 cross-cuts of 1 mm square size were provided in the optical laminate according to an adhesion test specified in JIS K 5400 (cross-cut tape method). A cellophane tape (an industrial 24 mm-width pressure-sensitive tape, manufactured by Nichiban Co., Ltd.) was applied to the laminate. Thereafter, the cellophane tape was peeled off, and the number of cross-cuts in which the coating film have remained unremoved was measured.

Evaluation 3: Measurement of Saturated Withstanding Voltage

Static Honest Meter H-0110 manufactured by Shishido Electrostatic, Ltd. was provided. An applied voltage of +10 kV was applied from a position distant by 20 mm from the hard coat face, and the saturated withstanding voltage was measured.

TABLE 1

| Ex. | Evaluation 1 | Evaluation 2 | Evaluation 3 |
|---|---|---|---|
| Ex. 1 | ○ | 100/100 | 1.4 kV |
| Comp. Ex. 1 | x | 0/100 | 1.4 kV |

The invention claimed is:

1. An optical laminate comprising a light transparent base material, an antistatic layer provided on the light transparent base material, and a hard coat layer provided on the surface of the antistatic layer, wherein the light transparent base material is a triacetyl cellulose resin film, wherein the optical laminate is formed by forming the antistatic layer having a concavoconvex on the light transparent base material by using an electroconductive polymer dispersion liquid, applying a composition for a hard coat layer comprising an ionizing radiation curing resin and a penetrating solvent selected from esters and ketones on the antistatic layer to cause the composition for the hard coat layer to penetrate into the antistatic layer and the light transparent base material, and curing the ionizing radiation curing resin in the composition for the hard coat layer to form the hard coat layer such that the optical laminate has a flat surface, wherein the concavoconvex has convexities having a height of not less than 40 nm and not more than 300 nm and a width of not less than 40 nm and not more than 100 μm, and has concavities having a height of not less than 5 nm and not more than 40 nm and a width of not less than 10 nm and not more than 100 μm, wherein the convexities and concavities have a quadrilateral cross-section in a thickness direction of the antistatic layer, and wherein the light transparent base material and the antistatic layer are joined together and the antistatic layer and the hard coat layer are joined together, wherein the interface between the light transparent base material and the antistatic layer, and the interface between the antistatic layer and the hard coat layer are not observable under a laser microscope.

2. The optical laminate according to claim 1, wherein the penetrating solvent is selected from the group consisting of methyl acetate, ethyl acetate, butyl acetate, and methyl ethyl ketone.

3. The optical laminate according to claim 1, wherein the composition for the hard coat layer comprises from 20% to 70% by weight of the penetrating solvent, based on the total weight of the composition for a hard coat layer.

4. The optical laminate according to claim 1, wherein the electroconductive polymer is polythiophene or its derivative.

5. The optical laminate according to claim 1, wherein the polythiophene derivative is represented by general formula (I):

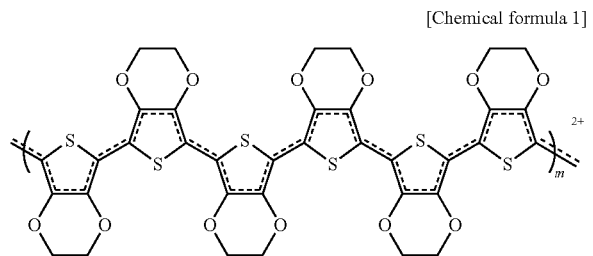

[Chemical formula 1]

wherein m is a number of 1 to 50.

6. The optical laminate according to claim 1, for use as an antireflection laminate.

7. An image display device comprising: a transmission display; and a light source device for applying light to the transmission display from its backside, wherein
an optical laminate according to claim 1 is provided on the surface of the transmission display.

8. The optical laminate according to claim 1, wherein the thickness of the hard coat layer is 0.8 μm to 20 μm.

9. A polarizing plate comprising a polarizing element, wherein
an optical laminate according to claim 1 is provided on the surface of the polarizing element so that the surface of the polarizing element faces the optical laminate on its light transparent base material.

10. An image display device comprising: a transmission display; and a light source device for applying light to the transmission display from its backside, wherein
a polarizing plate according to claim 9 is provided on the surface of the transmission display.

* * * * *